United States Patent [19]
Karlow et al.

[11] Patent Number: 5,588,672
[45] Date of Patent: Dec. 31, 1996

[54] SIDE IMPACT HEAD RESTRAINT WITH INFLATABLE DEPLOYMENT

[75] Inventors: James P. Karlow, Milford; Mohamed Boumarafi, Rochester Hills; Jonathan P. Hurford, Lake Orion, all of Mich.

[73] Assignee: Takata, Inc., Auburn Hills, Mich.

[21] Appl. No.: 545,944

[22] Filed: Oct. 20, 1995

[51] Int. Cl.[6] ................................. B60R 21/22
[52] U.S. Cl. .................... 280/730.2; 280/730.1; 280/749
[58] Field of Search .............. 280/730.2, 730.1, 280/749, 733, 801.2, 804, 753; 180/282, 271

[56] References Cited

U.S. PATENT DOCUMENTS

| | | | |
|---|---|---|---|
| 3,687,485 | 8/1972 | Campbell | 280/730.1 |
| 3,953,049 | 4/1976 | Surace et al. | 280/730.1 |
| 4,946,191 | 8/1990 | Putsch | 280/730.1 |
| 4,966,388 | 10/1990 | Warner et al. | 280/730.1 |
| 5,033,236 | 7/1991 | Szerdahelyi et al. | 49/502 |
| 5,161,821 | 11/1992 | Curtis | 280/730.1 |
| 5,265,903 | 11/1993 | Kuretake et al. | 280/730.1 |
| 5,282,648 | 2/1994 | Peterson | 280/733 |
| 5,322,322 | 6/1994 | Bark et al. | 280/730.2 |
| 5,324,072 | 6/1994 | Olson et al. | 280/730.2 |
| 5,333,898 | 8/1994 | Stutz | 280/730.2 |
| 5,333,899 | 8/1994 | Witte | 280/730.2 |
| 5,362,097 | 11/1994 | Barske | 280/730.1 |
| 5,366,241 | 11/1994 | Kithil | 280/735 |
| 5,462,308 | 10/1995 | Seki et al. | 280/749 |
| 5,464,246 | 11/1995 | Castro et al. | 280/730.2 |
| 5,470,103 | 11/1995 | Vaillancourt et al. | 280/730.1 |

FOREIGN PATENT DOCUMENTS

| | | | |
|---|---|---|---|
| 2249988 | 4/1974 | Germany | 280/730.2 |
| 2628815 | 1/1978 | Germany . | |
| 4307175 | 9/1993 | Germany . | |
| 5139232 | 6/1993 | Japan . | |
| 2191450 | 12/1987 | United Kingdom . | |

*Primary Examiner*—Christopher P. Ellis
*Attorney, Agent, or Firm*—Harness, Dickey & Pierce, PLC

[57] ABSTRACT

A side impact head restraint with inflatable deployment in which an inflatable member having a movable mounting point is used to deploy a fabric panel during a side impact collision for head protection. The inflatable member, made of coated fabric, is pressurized by a gas generator. The inflatable member is connected to fabric panel and is used to bring a fabric panel into position in the window area of a side door of the vehicle. The fabric panel is secured at three points, two fixed points located on the upper side rail and a third movable point on a track located on the "B" pillar. The inflatable member pushes the movable mounting point down the track from a position near the upper side rail down to a position immediately below the centerline of the side glass. The movable point locks into position at the end of the travel, when fully deployed. The fabric panel can then be loaded by the head wherein fabric elongation absorbs head impact energy.

20 Claims, 3 Drawing Sheets

SIDE IMPACT HEAD RESTRAINT WITH INFLATABLE DEPLOYMENT

FIELD OF THE INVENTION

The present invention relates to motor vehicle safety devices. More particularly, the present invention relates to deployable restraint systems especially adapted for providing side impact protection for the head of a vehicle occupant.

BACKGROUND OF THE INVENTION

In the past several decades, automotive manufacturers have made great strides in enhancing the safety of motor vehicles in terms of impact protection. While seat belt systems provide a high degree of occupant impact protection, deployable impact protection devices such as inflatable air bags are now in common place use in motor vehicles. Air bags for the driver and passenger side front seat occupants are commonly found in vehicles today. Until recently, the primary attention in the design of deployable restraints was directed toward providing frontal impact protection.

Motor vehicle manufacturers and their suppliers of safety systems are increasingly focusing on deployable devices providing side impact protection. Statistically, side impacts pose a greater probability of causing significant occupant injury as compared with frontal impacts. This difference is largely due to the limited energy absorption structure available in side impact situations, especially for the "on side" occupant. In response to this concern, vehicle manufacturers and suppliers are developing side impact air bags which are mounted either to the door or body pillar structure, or to the seat back of the occupant seat. In response to a signal from a crash sensor, an inflator generates gas. The expanding gas fills a woven fabric air bag which fills an area between the door and occupant. To date, the primary emphasis for deployable side impact devices has been protecting the torso and pelvic area of the occupant. Providing head protection for side impact collisions poses a number of design challenges beyond that posed for torso and pelvic protection. In the case of a side impact air bag for torso and pelvic protection, the door structure acts as a "reaction plate" to support the air bag as it is compressed by the occupant thus providing energy absorption. In the head area, a convenient reaction plate surface is not present. This is the case since the side door window is movable and thus can be in the down position during impact and is made of a brittle material. Accordingly, the window cannot be relied upon as a reaction plate for an air bag. One approach toward resolving the above referenced difficulties for side impact head protection is to provide a deployable fabric shade or curtain tied to the door frame which provides an instantaneous support structure for an air bag or deployable safety curtain. After detection of the side impact crash, the system pulls down a curtain which covers the upper portion of the side window door. In one design of such device, the deployment mechanism incorporates a pyrotechnically powered actuator coupled to a wire and pulley system to pull down the curtain from its non-deployed stored state into a deployed condition. Although such a system appears workable, it is believed to be difficult to incorporate it into a vehicle structure.

In motor vehicle design today, size and mass constraints are of critical importance. This is especially true for the side frame area of an automobile body where there is very tight packaging space. In order to be cost effective, the design of a deployable side impact restraint device should be applicable across many vehicle platforms and provide low cost fabrication and assembly, with high quality and reliability.

Thus, there is a need for a side impact head restraint which can provide a low cost means of deploying head protection in side impact collisions. There is also a need for a deployment means which works without substantial accommodation or redesign by the vehicle. Furthermore, there is a need for a side impact head restraint system which meets the minimal packing space requirements for installation in the side frame area of an automobile door.

SUMMARY OF THE INVENTION

The present invention provides a side impact head restraint with inflatable deployment in which an inflatable member has a movable mounting point and is used to deploy a fabric panel during a side impact collision for head protection.

One object of the present invention is to provide a low cost means of deploying head protection in side impact collisions.

It is another object of the present invention to provide a method for deploying a fabric panel which works without substantial accommodation or re-design by the vehicle.

It is a still further object of the present invention to provide a side impact head restraint system which meets minimal packing space requirements and which can be trimmed for aesthetic purposes.

In order to achieve the foregoing objects, the present invention provides an inflatable member made of coated fabric which is pressurized by a gas generator. The inflatable member is connected to a movable mounting point mounted on a track and is used to bring a fabric panel into position in the window area of a side door of a vehicle to provide head protection in a side impact collision. The fabric panel is secured at three points, two fixed points located on the upper side rail and a third movable point on a track located on the "B" pillar. The inflatable member and fabric panel are folded and secured behind a trim close-out panel covering the upper rail and "B" pillar of the side door of the vehicle. During deployment, the gas generator fills the inflatable member driving the movable mounting point down the track moving from a position near the upper side rail down to a position immediately below the centerline of the side glass. The movable point locks into position at the end of the travel, when fully deployed. The fabric panel follows the movable mounting point and, when fully deployed, can be loaded by the head wherein fabric elongation absorbs head impact energy. The present designs permit latitude in positioning the gas generator 12, since the inflatable member 14 can be located anywhere on the restraint curtain 20.

In a first preferred embodiment, the inflatable member comprises a tubular section located adjacent the track near the rear edge of the side window. In a second embodiment, a number of inflatable tubular sections, known as "fingers", emanating from a common corner, deploy a fabric panel including the tubular sections for head protection in side impact collisions. In this embodiment, the fingers not only help bring the panel into position, but also provide protection to the head in the areas of the upper side rail and the upper "B" pillar. In a third embodiment, an inflatable cushion with a cloth manifold and multiple tubular inflatable members is used to provide head protection in a side impact collision. In this embodiment, the deployed fabric cushion acts to absorb head impact injury in side impact collisions.

DETAILED DESCRIPTION OF THE PREFERRED EMBODIMENT

Figure 1:
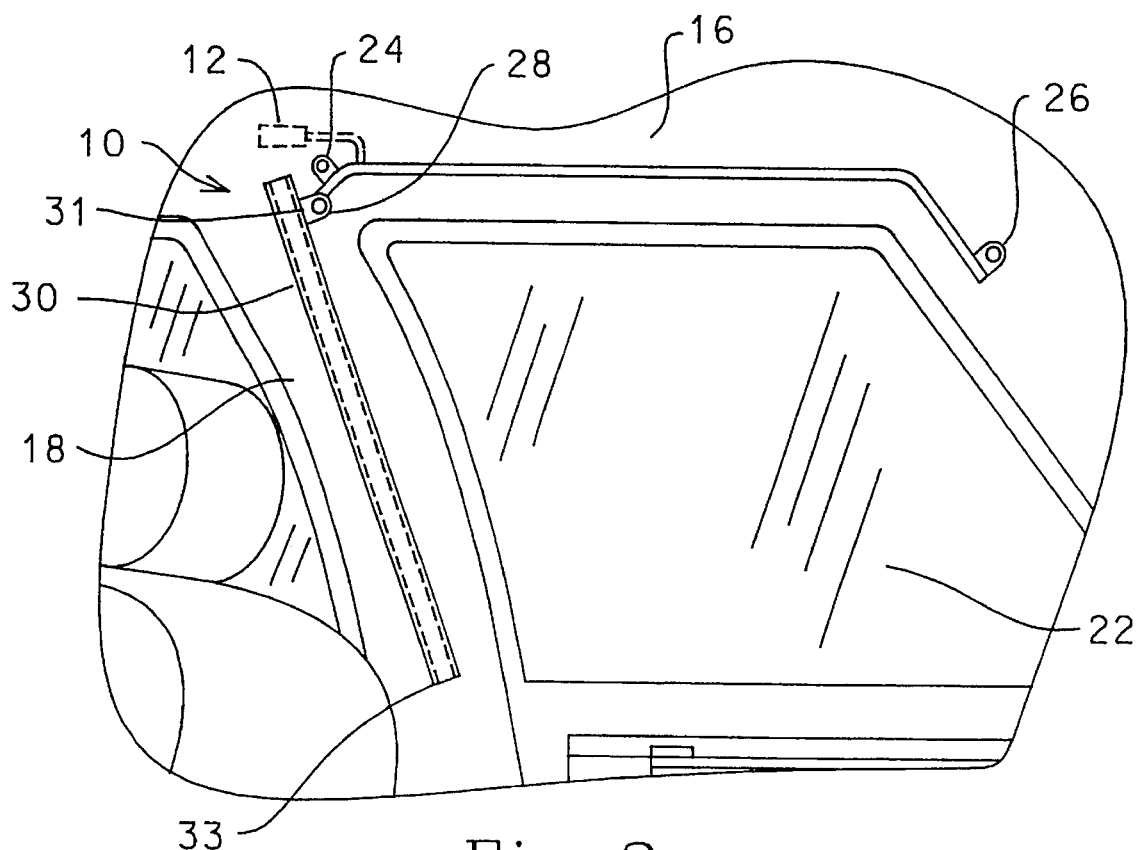
FIG. 1 is an interior side view of a vehicle car door area showing a first embodiment of the deployable restraint system in accordance with the present invention as shown in a nondeployed condition.

Preferred embodiments of the side impact head restraint with inflatable deployment are described herebelow with reference to the drawings.

Referring to FIGS. 1–3b, the side impact head restraint with inflatable deployment, indicated generally at 10, includes a crash sensor (not shown) mounted inside the side door of the vehicle or B-Pillar for sensing a side impact collision and generating a crash signal when a side impact collision is sensed. The crash signal is sent to a gas generator 12 which generates gas used to inflate an inflatable member 14. The inflatable member 14, when undeployed, is folded and secured behind the trim close-out panel covering the upper side rail 16 and "B" pillar 18 of the side door. Preferably, the inflatable member 14 is tubular in shape and is made of coated fabric, however other shapes and materials can be used.

The inflatable member 14 is attached to a restraint curtain 20, which is also folded and secured behind the trim close-out panel when undeployed. A trim tear seam can be provided to obscure the device and to enhance the aesthetic quality. The restraint curtain 20 is configured to deploy into the window area 22 of the vehicle side door covering at least the portion of the window area 22 adjacent the vehicle occupant's head. Preferably, the restraint curtain 20 is made of fabric which would absorb head impact energy during a side impact collision through fabric elongation.

The restraint curtain 20 is secured by at least three securing points located inside the vehicle adjacent the window area 22 of the side door. A first and second securing points 24, 26 are fixedly positioned on the body or window frame near the upper-rear and upper-forward corners of the window area 22, respectively. A third securing point 28 is movedly mounted in a generally vertical track 30. The track 30 is positioned on the "B" pillar or door near the rear edge of the window area 22. The third securing point 28 is comprised of a slider 31 mounted in the track 30.

Figure 2:
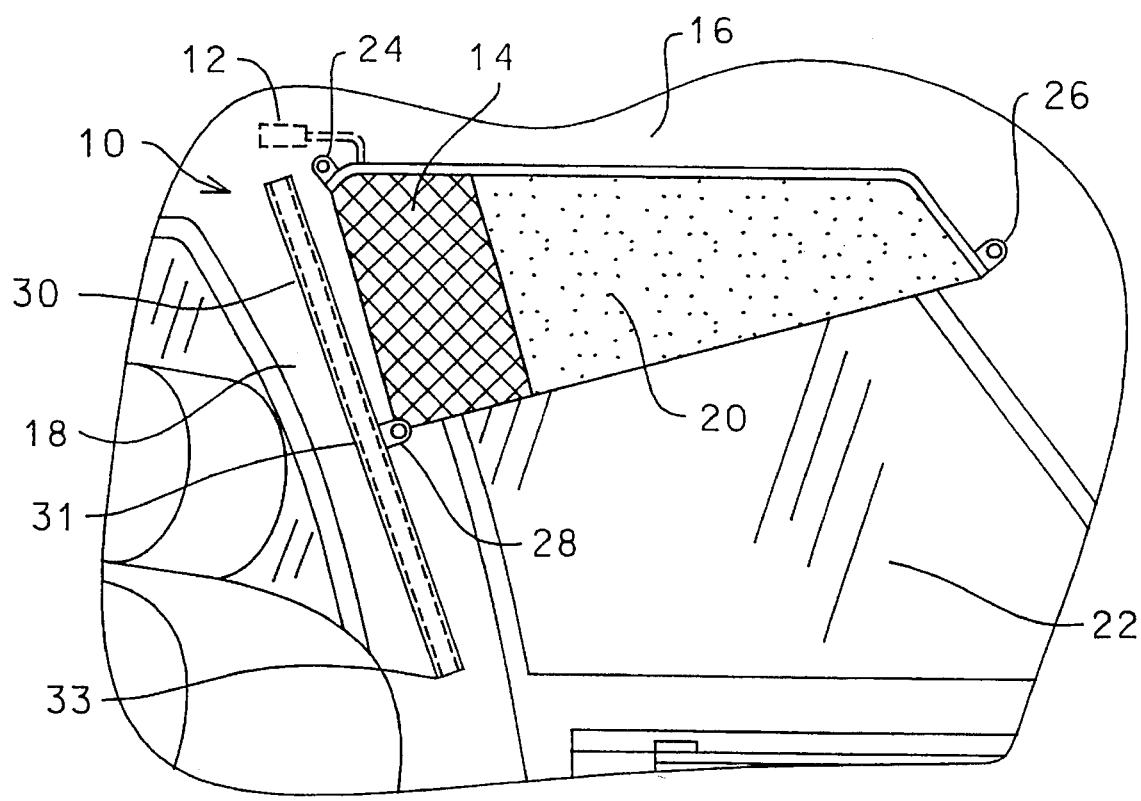
FIG. 2 is an interior side view of the vehicle car door area of FIG. 1 showing the first embodiment of the deployable restraint system in a partially deployed condition.
Figure 3A:
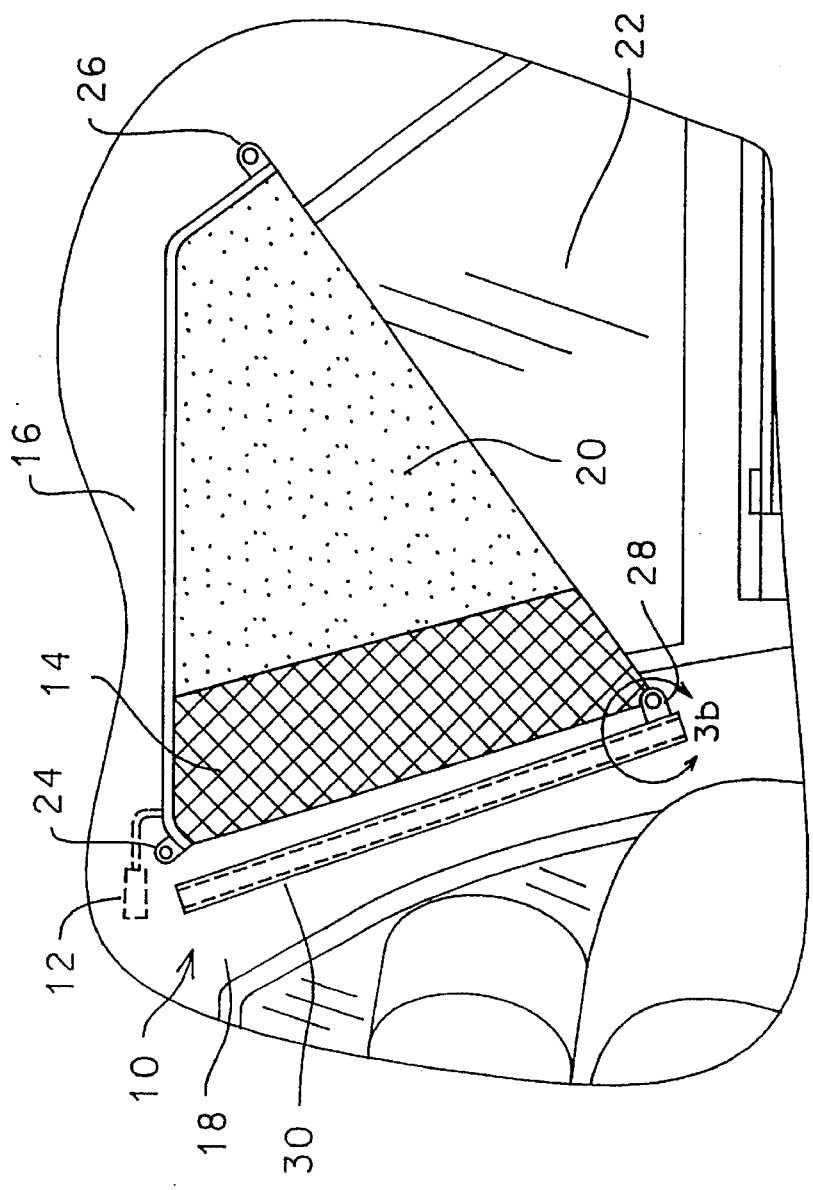
FIG. 3a is an interior side view of the vehicle car door area shown in FIG. 1 showing the first embodiment of the deployable restraint system of the present invention in a fully deployed condition.
Figure 3B:
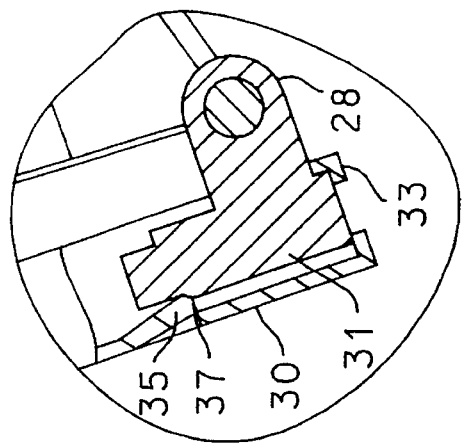
FIG. 3b is an exploded cross-sectional view showing the slider locking mechanism of the present invention.

In the undeployed position, as shown in FIG. 1, the third securing point 28 is positioned near the upper-rear corner of the window area 22. While the inflatable member 14 is being inflated, the slider 31 is configured to freely slide along the track 30 toward the lower-rear corner of the window area 22, as shown in FIG. 2, thus deploying the restraining curtain 20. The inflation of the inflatable member 14 propels the slider 31 down the track 30 in a forcible manner. As the slider 31 moves downwardly along the track 30, it pulls with it a lower edge of the restraint curtain 20 thus pulling the restraint curtain 20 from it undeployed condition. When the slider 31 reaches the lower end of the track 30 it is prevented from discharging from the track 31 by contact with track end 33. The slider 31 is maintained in this position by engagement with a ramp 35. As the slider 31 engages the ramp 35, the ramp 35 deflects allowing the slider 31 to move past the ramp 35. Once past, the ramp 35 springs back to its normal position, thus blocking the slider 31 from moving upwardly due to contact between the end surface 37 and the slider 31. In this position, the slider 31 is locked into position at the end of travel along the track 30, holding the curtain 20 in a fully deployed position, as shown in FIG. 3a.

In the fully deployed position, the restraining curtain 20 covers at least the portion of the window area 22 adjacent the occupant's head. During a side impact collision, the curtain 20 can be loaded by the head such that fabric elongation, deformation at the mounting points, elongation of the inflatable member and venting of gas from the inflatable member all act to absorb head impact energy. Furthermore, the inflatable member 14 is preferably positioned along the rear edge of the window area 22 to provide additional cushioning for the occupant's head.

Figure 4:
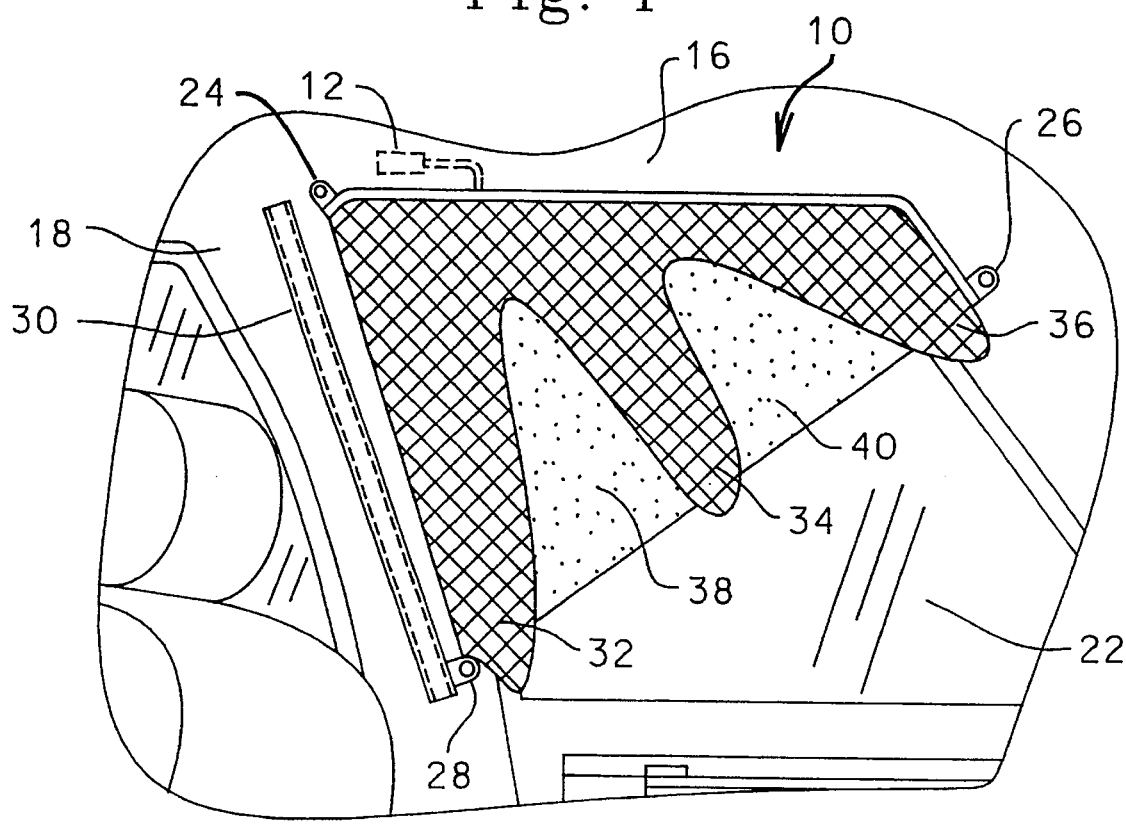
FIG. 4 is an interior side view of a vehicle car door area showing a second embodiment of the deployable restraint system of the present invention in a fully deployed condition.

In a second embodiment, as shown in FIG. 4, the inflatable member comprises three inflatable fingers 32, 34, 36, emanating from a common corner position, and the restraint curtain includes fabric panels 38, 40 extending between the inflatable fingers 32, 34, 36. A first inflatable finger 32 extends downward along the rear edge of the window area. A second inflatable finger 34 extends from the upper-rear corner toward the lower-forward corner of the window area. A third inflatable finger 38 extends along the upper edge of the window area. The inflatable fingers 32, 34, 36 are joined together in an area near the upper-rear corner of the window area 22. The fabric panels 38, 40 are secured between the inflatable fingers 32, 34, 36 to provide protection for the vehicle occupant's head during a side impact collision. The inflatable fingers 32, 34, 36 not only help bring the panels 38, 40 into position, but also provide protection in the areas of the upper side rail 16 and "B" pillar 18.

Figure 5:
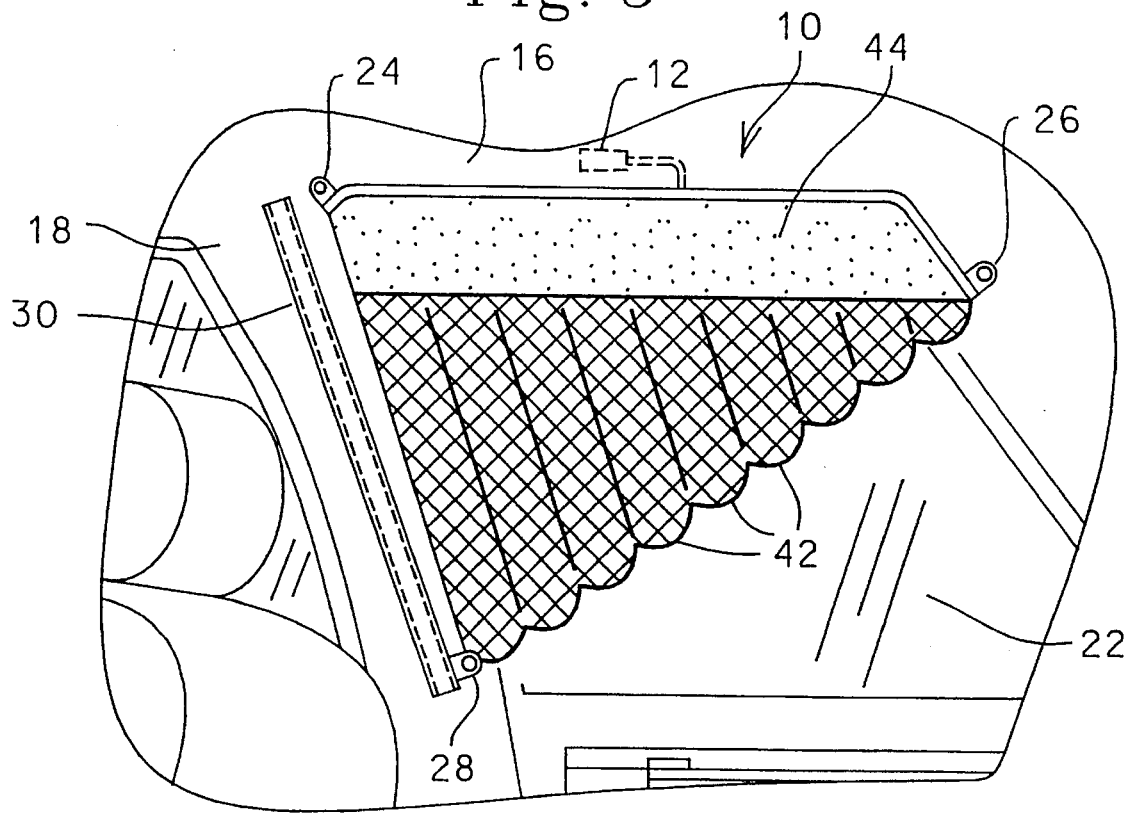
FIG. 5 is an interior side view of a vehicle car door area showing a third embodiment of the deployable restraint system of the present invention in a fully deployed condition.

In a third embodiment, as shown in FIG. 5, the inflatable member comprises a plurality of inflatable fingers 42 and a cloth manifold 44. The plurality of fingers 42 are configured to extend parallel to each other, vertically downward from the cloth manifold 44 and upper side rail 16 into the window area 22 during a side impact collision. The plurality of fingers 42 can be individual inflatable members or, more likely, sewn subsections of an inflatable cushion. Elongation of the manifold 44, as well as other factors mentioned above, act to absorb head impact energy.

It is to be understood that the invention is not limited to the exact construction illustrated and described above, but that various changes and modifications may be made without departing from the spirit and scope of the invention as defined in the following claims.

We claim:

1. A side impact head restraint system for cushioning a vehicle occupant's head during a side impact collision including means for sensing the side impact collision and generating a crash signal thereupon, said system comprising:

a restraint curtain mounted inside the vehicle adjacent a window area of a side door of the vehicle, said curtain having at least three securing points, wherein first and second securing points are fixedly attached on an upper rail of said side door and a third securing point is movably mounted on a generally vertical track located adjacent a track edge of said window area, said track running along said track edge from an upper edge toward a lower edge of said window area, said first securing point being located near said upper edge and a rear edge of said window area and said second securing point being located near said upper edge and a forward edge of said window area;

an inflatable member carried by said restraint curtain;

a gas generator in fluid communication with said inflatable member, said gas generator for generating gas in response to said crash signal wherein said generated gas inflates said inflatable member causing said third securing point to move along said track, driven by said inflatable member, from an undeployed position near said upper edge of said window area to a deployed position near said lower edge of said window area thereby pulling said curtain into a deployed condition covering at least a portion of said window area thus providing restraint for the vehicle occupant's head, wherein said third securing point locks into position at the end of travel along said track when said curtain is fully deployed.

2. A side impact head restraint system according to claim 1, wherein said inflatable member is tubular in shape and is located in an area near said rear edge of said window area.

3. A side impact head restraint system according to claim 1, wherein said inflatable member comprises three deployment fingers such that when inflated a first deployment finger runs in a substantially vertical direction near said rear edge inside said window area, a second deployment finger runs in a substantially horizontal direction near said upper edge inside said window area and a third deployment finger runs in a direction beginning at an upper/rear location where said upper edge and said rear edge meet and running toward a lower/forward location where said lower edge and said forward edge meet.

4. A side impact head restraint system according to claim 3, wherein said restraint curtain comprises fabric panels extending between said first, second and third deployment fingers.

5. A side impact head restraint system according to claim 1, wherein said restraint curtain comprises a plurality of inflatable fingers carried by a cloth manifold wherein said plurality of inflatable fingers are configured to be inflated by said gas generator to extend to cover said portion of said window area.

6. A side impact head restraint system according to claim 1, wherein said restraint curtain and said inflatable member are folded and secured behind a trim close-out panel covering said upper side rail and a "B" pillar of said side door of the vehicle.

7. A side impact head restraint system according to claim 1, wherein said third securing point comprises a slider carried by said track, said slider configured to slide along said track in response to inflation of said inflatable member.

8. A side impact head restraint system according to claim 1, wherein said track is located on a "B" pillar of said side door of the vehicle adjacent to said window area.

9. A side impact head restraint system for cushioning a vehicle occupant's head during a side impact collision including means for sensing the side impact collision and generating a crash signal thereupon, said system comprising:

a restraint curtain mounted inside the vehicle adjacent a window area of a side door of the vehicle, said curtain having at least three securing points, wherein first and second securing points are fixedly attached on an upper rail of said side door and a third securing point is movably mounted on a generally vertical track located adjacent a track edge of said window area, said track running along said track edge from an upper edge to a lower edge of said window area, said first securing point being located near said upper edge and a rear edge of said window area and said second securing point being located near said upper edge and a forward edge of said window area;

an tubular inflatable member carried by said restraint curtain;

a gas generator in fluid communication with said inflatable member, said gas generator for generating gas in response to said crash signal wherein said generated gas inflates said inflatable member causing said third securing point to move along said track, driven by said inflatable member, from an undeployed position near said upper edge of said window area to a deployed position near said lower edge of said window area thereby pulling said curtain into a deployed condition covering at least a portion of said window area and said inflatable member covering a portion of a "B" pillar of said side door, thus providing restraint for the vehicle occupant's head, wherein said third securing point locks into position at the end of travel along said track when said curtain is fully deployed.

10. A side impact head restraint system according to claim 9, wherein said third securing point comprises a slider carried by said track, said slider configured to slide along said track in response to inflation of said inflatable member.

11. A side impact head restraint system according to claim 9, wherein said track is located on the "B" pillar of said side door of the vehicle adjacent to said window area.

12. A side impact head restraint system according to claim 9, wherein said restraint curtain and said inflatable member are folded and secured behind a trim close-out panel covering said upper side rail and the "B" pillar of said side door of the vehicle.

13. A side impact head restraint system for cushioning a vehicle occupant's head during a side impact collision including means for sensing the side impact collision and generating a crash signal thereupon, said system comprising:

a restraint curtain mounted inside the vehicle adjacent a window area of a side door of the vehicle, said curtain having at least three securing points, wherein first and second securing points are fixedly attached on an upper rail of said side door and a third securing point is movably mounted on a generally vertical track located adjacent a track edge of said window area, said track running along said track edge from an upper edge to a lower edge of said window area, said first securing point being located near said upper edge and a rear edge of said window area and said second securing point being located near said upper edge and a forward edge of said window area;

an inflatable member carried by said restraint curtain, wherein said inflatable member comprises at least two deployment fingers, said fingers configured to provide an improved contact surface for said occupant's head during a side impact collision and said restraint curtain comprising fabric panels sewn between said fingers configured to absorb head impact energy through fabric elongation;

a gas generator in fluid communication with said inflatable member, said gas generator for generating gas in response to said crash signal wherein said generated gas inflates said deployment fingers of said inflatable member causing said deployment fingers to extend to said window area covering at least a portion of said window area and also causing said third securing point to move along said track, driven by said inflatable member, from an undeployed position near said upper edge of said window area to a deployed position near said lower edge of said window area thereby pulling said curtain into a deployed condition covering at least a portion of said window area thus providing restraint for the vehicle occupant's head wherein said third securing point locks into position at the end of travel along said track when said curtain is fully deployed.

14. A side impact head restraint system according to claim 13, wherein said third securing point comprises a slider carried by said track, said slider configured to slide along said track in response to inflation of said inflatable member.

15. A side impact head restraint system according to claim 13, wherein said track is located on a "B" pillar of said side door of the vehicle adjacent to said window area.

16. A side impact head restraint system according to claim 13, wherein said restraint curtain and said inflatable member are folded and secured behind a trim close-out panel covering said upper side rail and a "B" pillar of said side door of the vehicle.

17. A side impact head restraint system for cushioning a vehicle occupant's head during a side impact collision including means for sensing the side impact collision and generating a crash signal thereupon, said system comprising:

a restraint curtain having a plurality of inflatable fingers carried by a cloth manifold inside the vehicle adjacent a window area of a side door of the vehicle said inflatable members configured to provide an improved contact surface for said occupant's head during a side impact collision and said manifold is configured to absorb head impact energy through fabric elongation, said curtain having at least three securing points, wherein first and second securing points are fixedly attached on an upper rail of said side door and a third securing point is movably mounted on a generally vertical track located adjacent a track edge of said window area, said track running along said track edge from an upper edge to a lower edge of said window area, said first securing point being located near said upper edge and a rear edge of said window area and said second securing point being located near said upper edge and a forward edge of said window area;

a gas generator in fluid communication with said plurality of inflatable fingers, said gas generator for generating gas in response to said crash signal wherein said generated gas inflates said plurality of inflatable fingers causing said third securing point to move along said track, driven by said inflatable fingers, from an undeployed position near said upper edge of said window area to a deployed position near said lower edge of said window area thereby pulling said curtain into a deployed condition, said plurality of inflatable fingers thus covering at least a portion of said window area providing restraint for the vehicle occupant's head wherein said third securing point locks into position at the end of travel along said track when said curtain is fully deployed.

18. A side impact head restraint system according to claim 17, wherein said track is located on a "B" pillar of said side door of the vehicle adjacent to said window area.

19. A side impact head restraint system according to claim 17, wherein said cloth manifold and said plurality of inflatable fingers are folded and secured behind a trim close-out panel covering said upper side rail and a "B" pillar of said side door of the vehicle.

20. A side impact head restraint system according to claim 17, wherein said third securing point comprises a slider carried by said track, said slider configured to slide along said track in response to inflation of said plurality of inflatable members.

\* \* \* \* \*